United States Patent
Ishida et al.

(10) Patent No.: US 12,450,953 B2
(45) Date of Patent: Oct. 21, 2025

(54) IN-VEHICLE DEVICE, VEHICLE MOVEMENT ANALYSIS SYSTEM

(71) Applicant: Hitachi Astemo, Ltd., Hitachinaka (JP)

(72) Inventors: Kyoko Ishida, Tokyo (JP); Goshi Sasaki, Tokyo (JP); So Sasatani, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 365 days.

(21) Appl. No.: 17/925,586

(22) PCT Filed: Feb. 24, 2021

(86) PCT No.: PCT/JP2021/006824
§ 371 (c)(1),
(2) Date: Nov. 15, 2022

(87) PCT Pub. No.: WO2021/245999
PCT Pub. Date: Dec. 9, 2021

(65) Prior Publication Data
US 2023/0196847 A1    Jun. 22, 2023

(30) Foreign Application Priority Data

Jun. 4, 2020   (JP) .................................. 2020-097354

(51) Int. Cl.
*G07C 5/00* (2006.01)
*B60W 40/04* (2006.01)
(Continued)

(52) U.S. Cl.
CPC .............. *G07C 5/008* (2013.01); *B60W 40/04* (2013.01); *G06T 7/20* (2013.01); *G06T 7/50* (2017.01);
(Continued)

(58) Field of Classification Search
CPC ..... G07C 5/008; G07C 5/0866; B60W 40/04; B60W 2554/80; B60W 2540/18;
(Continued)

(56) References Cited

U.S. PATENT DOCUMENTS

| 9,535,878 B1 | 1/2017 | Brinkmann et al. |
| 2010/0002080 A1 | 1/2010 | Maki |

(Continued)

FOREIGN PATENT DOCUMENTS

| JP | 2010-035159 A | 2/2010 |
| JP | 2010146477 A * | 7/2010 |

(Continued)

OTHER PUBLICATIONS

International Search Report with English Translation and Written Opinion dated May 18, 2021 in corresponding International Application No. PCT/JP2021/006824.

*Primary Examiner* — Mekonen T Bekele
(74) *Attorney, Agent, or Firm* — Foley & Lardner LLP (57) ABSTRACT

An object of the present invention is to provide a technique for suppressing a data capacity by appropriately selecting a data item that needs to be collected in order to analyze an accident situation or the like. An in-vehicle device according to the present invention acquires data describing a state of a vehicle and a surrounding situation of the vehicle, and selects and outputs a record in which at least one of an operation of the vehicle or an operation of a surrounding object exceeds a threshold among records described in the data (see FIG. 1).

9 Claims, 7 Drawing Sheets

(51) Int. Cl.
    *G06T 7/20*     (2017.01)
    *G06T 7/50*     (2017.01)
    *G06T 7/70*     (2017.01)
    *G06V 20/58*     (2022.01)
    *G08G 1/16*     (2006.01)

(52) U.S. Cl.
    CPC .............. *G06T 7/70* (2017.01); *G06V 20/58* (2022.01); *G08G 1/166* (2013.01); *B60W 2554/80* (2020.02); *G06T 2207/30261* (2013.01)

(58) Field of Classification Search
    CPC ..... B60W 2554/801; B60W 2554/802; B60W 2554/804; B60W 2556/10; G06T 7/20; G06T 7/50; G06T 7/70; G06V 20/58; G06V 20/56; G08G 1/166; G08G 1/0112; G08G 1/0133
    See application file for complete search history.

(56) References Cited

U.S. PATENT DOCUMENTS

2016/0155004 A1    6/2016    Shiraishi et al.
2017/0072850 A1*    3/2017    Curtis ................. G08G 1/0112

FOREIGN PATENT DOCUMENTS

| JP | 2016-103142 A | | 6/2016 | |
| JP | 2017193318 A | * | 10/2017 | ............ B60W 10/04 |
| JP | 2019-160199 A | | 9/2019 | |
| JP | 2019-161350 A | | 9/2019 | |
| WO | WO-2012043388 A1 | * | 4/2012 | ............ B60W 40/12 |

* cited by examiner

| TIME STAMP (hh:mm:ss.SSS) | STEERING ANGLE (RADIAN) | LATITUDE | LONGITUDE | IMAGE | SINKING ANGLE (RADIAN) |
|---|---|---|---|---|---|
| 10:00:00.000 | 0.152 | LATITUDE A | LONGITUDE A | IMAGE A | -0.002 |
| 10:00:00.100 | 0.150 | LATITUDE B | LONGITUDE B | IMAGE B | 0.002 |
| 10:00:00.200 | 0.148 | LATITUDE C | LONGITUDE C | IMAGE C | 0.007 |
| 10:00:00.300 | 0.147 | LATITUDE D | LONGITUDE D | IMAGE D | 0.005 |
| 10:00:00.400 | 0.145 | LATITUDE E | LONGITUDE E | IMAGE E | 0.002 |
| ... | ... | ... | ... | ... | ... |
| 10:00:01.600 | 0.002 | LATITUDE F | LONGITUDE F | IMAGE F | -0.001 |
| 10:00:01.700 | -0.003 | LATITUDE G | LONGITUDE G | IMAGE G | 0.000 |
| 10:00:01.800 | -0.001 | LATITUDE H | LONGITUDE H | IMAGE H | 0.001 |
| 10:00:01.900 | 0.000 | LATITUDE I | LONGITUDE I | IMAGE I | 0.001 |
| 10:00:02.000 | 0.001 | LATITUDE J | LONGITUDE J | IMAGE J | 0.002 |
| ... | ... | ... | ... | ... | ... |
| 10:00:04.600 | 0.002 | LATITUDE K | LONGITUDE K | IMAGE K | 0.032 |
| 10:00:04.700 | -0.004 | LATITUDE L | LONGITUDE L | IMAGE L | 0.044 |
| 10:00:04.800 | -0.001 | LATITUDE M | LONGITUDE M | IMAGE M | 0.047 |
| 10:00:04.900 | 0.002 | LATITUDE N | LONGITUDE N | IMAGE N | 0.029 |
| 10:00:05.000 | 0.000 | LATITUDE O | LONGITUDE O | IMAGE O | 0.023 |

FIG. 4

| TIME STAMP (hh:mm:ss.SSS) | PRECEDING VEHICLE LONGITUDINAL ACCELERATION/ DECELERATION | PRECEDING VEHICLE LATERAL ACCELERATION/ DECELERATION | OWN VEHICLE VIBRATION |
|---|---|---|---|
| 10:00:00.000 | ABSENT | ABSENT | ABSENT |
| 10:00:00.010 | ABSENT | ABSENT | ABSENT |
| 10:00:00.020 | ABSENT | ABSENT | PRESENT |
| 10:00:00.030 | ABSENT | ABSENT | PRESENT |
| 10:00:00.040 | ABSENT | ABSENT | ABSENT |
| ⋮ | ⋮ | ⋮ | ⋮ |
| 10:00:01.960 | PRESENT | ABSENT | ABSENT |
| 10:00:00.970 | PRESENT | ABSENT | ABSENT |
| 10:00:01.980 | PRESENT | ABSENT | ABSENT |
| 10:00:01.990 | PRESENT | ABSENT | ABSENT |
| 10:00:02.000 | PRESENT | ABSENT | ABSENT |
| ⋮ | ⋮ | ⋮ | ⋮ |
| 10:00:04.960 | ABSENT | PRESENT | PRESENT |
| 10:00:04.970 | ABSENT | PRESENT | PRESENT |
| 10:00:04.980 | ABSENT | PRESENT | PRESENT |
| 10:00:04.990 | ABSENT | PRESENT | PRESENT |
| 10:00:05.000 | ABSENT | PRESENT | PRESENT |

FIG. 5

| TIME STAMP (hh:mm:ss.SSS) 501 | STEERING ANGLE (RADIAN) 502 | LATITUDE 503 | LONGITUDE 504 | IMAGE 505 | SINKING ANGLE (RADIAN) 506 |
|---|---|---|---|---|---|
| 10:00:00.000 | 1.00 SECONDS | 1.00 SECONDS | 1.00 SECONDS | 1.00 SECONDS | NOT COLLECTED |
| 10:00:00.100 | 1.00 SECONDS | 1.00 SECONDS | 1.00 SECONDS | 1.00 SECONDS | NOT COLLECTED |
| 10:00:00.200 | 1.00 SECONDS | 1.00 SECONDS | 1.00 SECONDS | 1.00 SECONDS | SYNCHRONIZED WITH IMAGE |
| 10:00:00.300 | 1.00 SECONDS | 1.00 SECONDS | 1.00 SECONDS | 1.00 SECONDS | SYNCHRONIZED WITH IMAGE |
| 10:00:00.400 | 1.00 SECONDS | 1.00 SECONDS | 1.00 SECONDS | 1.00 SECONDS | NOT COLLECTED |
| ... | ... | ... | ... | ... | ... |
| 10:00:01.600 | 0.10 SECONDS | 0.10 SECONDS | 0.10 SECONDS | 0.10 SECONDS | NOT COLLECTED |
| 10:00:01.700 | 0.10 SECONDS | 0.10 SECONDS | 0.10 SECONDS | 0.10 SECONDS | NOT COLLECTED |
| 10:00:01.800 | 0.10 SECONDS | 0.10 SECONDS | 0.10 SECONDS | 0.10 SECONDS | NOT COLLECTED |
| 10:00:01.900 | 0.10 SECONDS | 0.10 SECONDS | 0.10 SECONDS | 0.10 SECONDS | NOT COLLECTED |
| 10:00:02.000 | 0.10 SECONDS | 0.10 SECONDS | 0.10 SECONDS | 0.10 SECONDS | NOT COLLECTED |
| ... | ... | ... | ... | ... | ... |
| 10:00:04.600 | 0.10 SECONDS | 0.10 SECONDS | 0.10 SECONDS | 0.10 SECONDS | SYNCHRONIZED WITH IMAGE |
| 10:00:04.700 | 0.10 SECONDS | 0.10 SECONDS | 0.10 SECONDS | 0.10 SECONDS | SYNCHRONIZED WITH IMAGE |
| 10:00:04.800 | 0.10 SECONDS | 0.10 SECONDS | 0.10 SECONDS | 0.10 SECONDS | SYNCHRONIZED WITH IMAGE |
| 10:00:04.900 | 0.10 SECONDS | 0.10 SECONDS | 0.10 SECONDS | 0.10 SECONDS | SYNCHRONIZED WITH IMAGE |
| 10:00:05.000 | 0.10 SECONDS | 0.10 SECONDS | 0.10 SECONDS | 0.10 SECONDS | SYNCHRONIZED WITH IMAGE |

| TIME STAMP (hh:mm:ss.SSS) | STEERING ANGLE (RADIAN) | LATITUDE | LONGITUDE | IMAGE | SINKING ANGLE (RADIAN) |
|---|---|---|---|---|---|
| 10:00:00.000 | 0.152 | LATITUDE A | LONGITUDE A | IMAGE A | |
| 10:00:00.100 | | | | | |
| 10:00:00.200 | | | | | |
| 10:00:00.300 | | | | | |
| 10:00:00.400 | | | | | |
| ... | ... | ... | ... | ... | ... |
| 10:00:01.600 | 0.002 | LATITUDE F | LONGITUDE F | IMAGE F | |
| 10:00:01.700 | -0.003 | LATITUDE G | LONGITUDE G | IMAGE G | |
| 10:00:01.800 | -0.001 | LATITUDE H | LONGITUDE H | IMAGE H | |
| 10:00:01.900 | 0.000 | LATITUDE I | LONGITUDE I | IMAGE I | |
| 10:00:02.000 | 0.001 | LATITUDE J | LONGITUDE J | IMAGE J | |
| ... | ... | ... | ... | ... | ... |
| 10:00:04.600 | 0.002 | LATITUDE K | LONGITUDE K | IMAGE K | 0.032 |
| 10:00:04.700 | -0.004 | LATITUDE L | LONGITUDE L | IMAGE L | 0.044 |
| 10:00:04.800 | -0.001 | LATITUDE M | LONGITUDE M | IMAGE M | 0.047 |
| 10:00:04.900 | 0.002 | LATITUDE N | LONGITUDE N | IMAGE N | 0.029 |
| 10:00:05.000 | 0.000 | LATITUDE O | LONGITUDE O | IMAGE O | 0.023 |

FIG. 8

IN-VEHICLE DEVICE, VEHICLE MOVEMENT ANALYSIS SYSTEM

TECHNICAL FIELD

The present invention relates to a data collection method in an in-vehicle device.

BACKGROUND ART

For the purpose of, for example, analysis of an accident situation of a vehicle, a device or a service has been proposed that collects data on a situation of the vehicle before and after occurrence of an accident or emergency braking operation, records the data in the vehicle, and transmits the data via a network. However, when a large amount of data is recorded or transmitted, the capacity of the recording device may be exceeded, and the load of the communication amount and the processing amount increases.

PTL 1 describes a determination unit 22 that determines that vehicle information is to be transmitted to a service providing apparatus 10 when the driver of a vehicle A performs an operation such as sudden steering or sudden braking to cause the vehicle A to behave beyond a certain standard, which is different from normal driving. PTL 1 further describes that the determination unit 22 outputs one still image obtained by imaging the periphery of the vehicle A at the time when it is determined that the vehicle information is to be transmitted, the position of the vehicle, and the time to the transmission unit 24 as part of the vehicle information, and causes the transmission unit to transmit the part of the vehicle information to the service providing apparatus 10.

PTL 2 describes that "A video recording device comprising: a control unit configured to analyze a video captured by the camera and control video quality of the video data generated by the generation unit based on a video change to control an amount of the video data stored in the storage unit by the video recording unit."

CITATION LIST

Patent Literature

PTL 1: JP 2019-160199 A
PTL 2: JP 2019-161350 A

SUMMARY OF INVENTION

Technical Problem

In PTL 1, collecting data on a vehicle situation is limited to data collection based only on an operation such as steering or braking by the driver of an own vehicle, and does not consider brake control by a driving assistance system or an operation of a surrounding vehicle, a person, or the like. Further, in PTL 1, there is only an effect of suppressing the data capacity by selecting a data item such as vehicle position information. Therefore, it is not assumed that the data capacity increases when the data of the high sampling period necessary for the analysis of the accident situation is transmitted. For example, in recent driving assistance systems, data collected by a camera or a light detection and ranging (LIDAR) sensor is utilized, and pixel data and point cloud data collected by these sensors have a large capacity, and thus a further increase in data capacity is expected.

In PTL 2, collection target data is limited to video. In vehicle safety standards, it may be stipulated as a guideline that data such as speed and acceleration is collected for analyzing an accident situation. In order to conform to such standards, it is necessary to collect data other than video.

The present invention has been made in view of the above problems, and an object of the present invention is to provide a technique for suppressing a data capacity by appropriately selecting a data item that needs to be collected in order to analyze an accident situation or the like.

Solution to Problem

An in-vehicle device according to the present invention acquires data describing a state of a vehicle and a surrounding situation of the vehicle, and selects and outputs a record in which at least one of an operation of the vehicle or an operation of a surrounding object exceeds a threshold among records described in the data.

ADVANTAGEOUS EFFECTS OF INVENTION

According to the in-vehicle device of the present invention, it is possible to suppress a data capacity by appropriately selecting a data item that needs to be collected in order to analyze an accident situation or the like. Other features, configurations, advantages, and the like of the present invention will be apparent from the following description of embodiments.

DESCRIPTION OF EMBODIMENTS

First Embodiment

In a first embodiment of the present invention, an in-vehicle device will be described which collects and transmits data regarding a situation of a vehicle for a period of five seconds before a timing at which the vehicle collides with a preceding vehicle.

Figure 1:
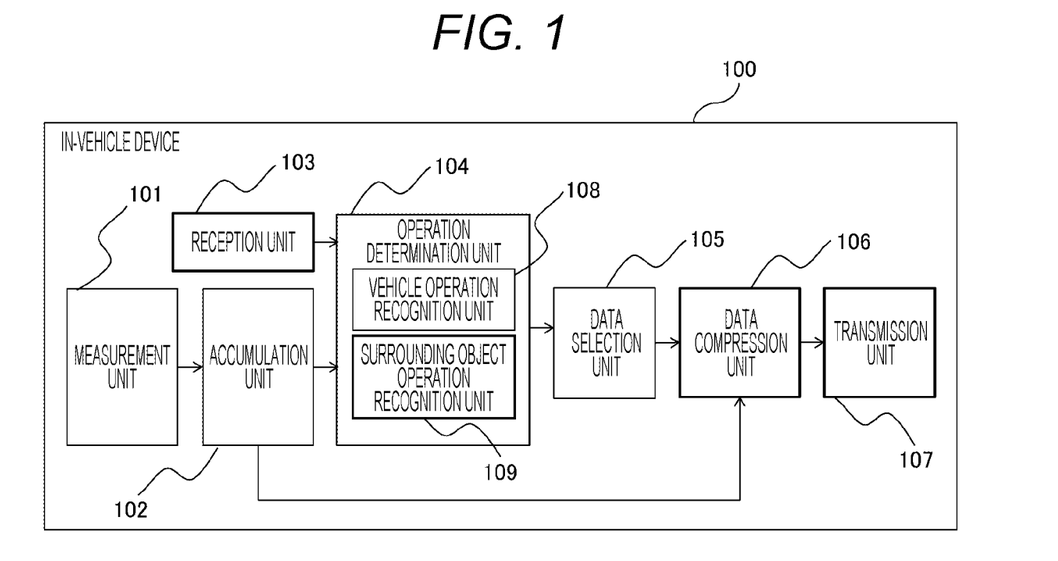
FIG. 1 is a block diagram illustrating a configuration example in a case where an in-vehicle device 100 according to a first embodiment is applied to a vehicle.

FIG. 1 is a block diagram illustrating a configuration example in a case where an in-vehicle device 100 according to the first embodiment is applied to a vehicle. The in-vehicle device 100 includes a measurement unit 101, an accumulation unit 102, a reception unit 103, an operation determination unit 104, a data selection unit 105, a data compression unit 106, and a transmission unit 107 (output unit). The operation determination unit 104 includes a vehicle operation recognition unit 108 and a surrounding object operation recognition unit 109. Details of a hardware configuration of each functional block and a function realized by the hardware will be described later.

Figure 2:
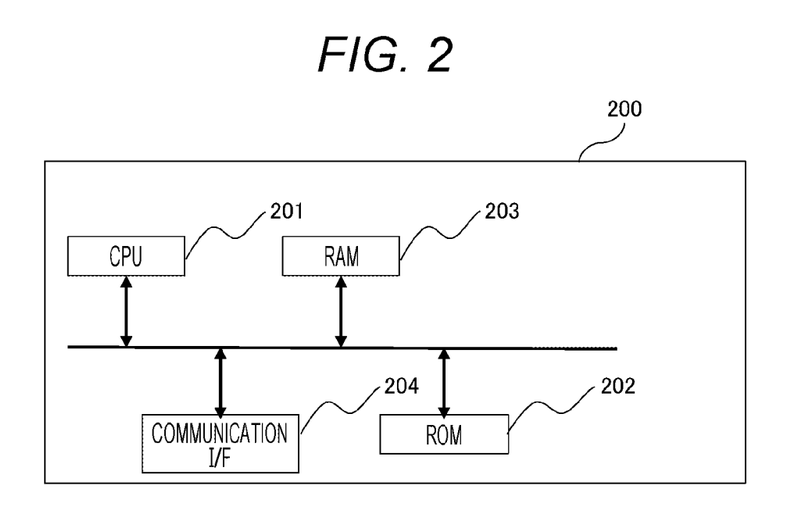
FIG. 2 is a diagram illustrating an example of a hardware configuration for realizing functional blocks of the in-vehicle device 100.

FIG. 2 is a diagram illustrating an example of a hardware configuration for realizing functional blocks of the in-vehicle device 100. The functional blocks in the in-vehicle device 100 described in FIG. 1 can be realized by an information processing device 200 operating according to a program. The information processing device 200 includes a central processing unit (CPU) 201, a read only memory (ROM) 202, a random access memory (RAM) 203, and a communication interface 204.

The CPU 201 reads a program stored in the ROM 202 or the RAM 203 and operates on the basis of the read program, thereby performing the operation of each functional block described in FIG. 1. The ROM 202 stores a boot program realized by the CPU 201 at the time of activation of the information processing device 200, a program depending on hardware of the information processing device 200, and the like. The RAM 203 stores programs executed by the CPU 201, data used by the CPU 201, and the like. Each functional block is constructed by executing a predetermined program read by the CPU 201. The communication interface 204 receives data from other devices in the vehicle, a server outside the vehicle, or the like via a cable, a network, or the like and transmits the data to the CPU 201, and transmits data generated by the CPU 201 to other devices in the vehicle, a server outside the vehicle, or the like via a cable, a network, or the like.

The measurement unit 101 is a functional unit that detects, as an electric signal, information detected by a sensor device, such as a steering angle sensor, a satellite signal receiver, a camera, or a gyro sensor, installed in the vehicle, converts the information into a digital electric signal by AD conversion as necessary, and obtains sensor data of the digital electric signal. The accumulation unit 102 is a functional unit that accumulates the sensor data for a last certain period of time obtained by the measurement unit 101. The reception unit 103 is a functional unit that detects, as an electric signal, a data collection instruction from another device inside the vehicle, a server outside the vehicle, or the like.

The operation determination unit 104 is a functional unit that, when the reception unit 103 receives a signal instructing data collection from the outside of the in-vehicle device 100, identifies the operation of the own vehicle and the operation of the surrounding object on the basis of the sensor data accumulated by the accumulation unit 102, and provides the resultant data to the data selection unit 105. Details of the operation determination unit 104 will be described later.

The data selection unit 105 is a functional unit that determines the necessity of data collection or the sampling period of data collection on the basis of the determination result of the operation determination unit 104 for the operation of the own vehicle and the operation of the surrounding object, and provides the determined collection necessity or the sampling period to the data compression unit 106. The data compression unit 106 is a functional unit that compresses the sensor data accumulated in the accumulation unit 102 according to the data item and the sampling period determined by the data selection unit 105. The transmission unit 107 is a functional unit that transmits the sensor data compressed by the data compression unit 106 to another device in the vehicle, a server outside the vehicle, or the like via a cable, a network, or the like.

Each functional unit included in the operation determination unit 104 will be described. The vehicle operation recognition unit 108 is a functional unit that identifies the operation of the own vehicle on the basis of the sensor data accumulated in the accumulation unit 102. The surrounding object operation recognition unit 109 is a functional unit that identifies the operation of the surrounding object on the basis of the sensor data accumulated in the accumulation unit 102.

The functional blocks of the in-vehicle device 100 in FIG. 1 have been described above. Next, processing executed by the in-vehicle device 100 in FIG. 1 will be described. The processing executed in the in-vehicle device 100 is roughly divided into a standby process and a data collection process.

The standby process executed in the in-vehicle device 100 will be described. The standby process is a process that is always executed continuously while power is supplied to the information processing device 200 in FIG. 2. For example, while an ignition switch of the vehicle is on, power is supplied to the information processing device, and the information processing device 200 is always executed. When the standby process is started, the measurement unit 101 detects, as an electric signal, information detected by a sensor device such as a steering angle sensor, a satellite signal receiver, a camera, or a gyro sensor installed in the vehicle, performs a conversion process or the like as necessary, and obtains sensor data of a digital electric signal. When the sensor data is measured, the accumulation unit 102 in FIG. 1 accumulates the sensor data for a last certain period of time obtained by the measurement unit 101. For example, in a case where the sensor data for the last five seconds measured by the measurement unit 101 is accumulated, when the measurement unit 101 newly obtains sensor data, the data accumulated five seconds before is erased and new data is stored, and the sensor data for the last five seconds is always accumulated.

Figure 3:
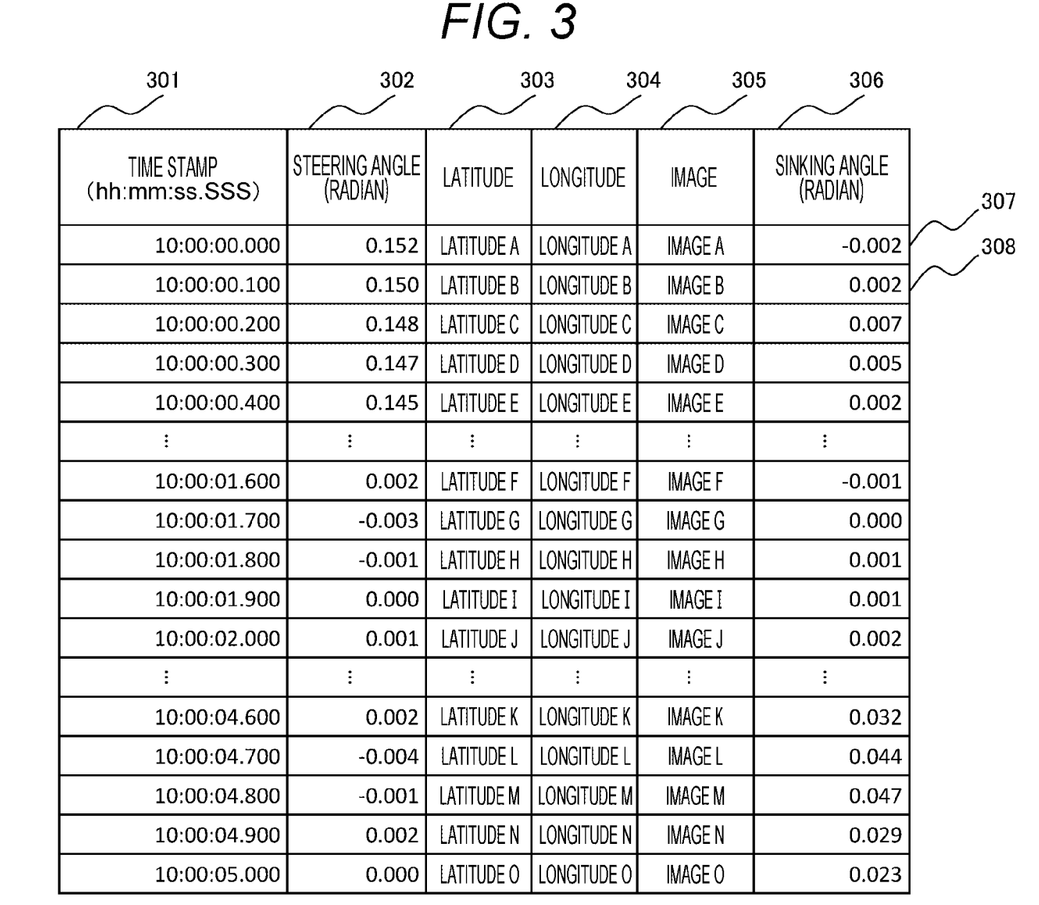
FIG. 3 is a sensor data table illustrating an example of sensor data accumulated by an accumulation unit 102 at a time of 10:00:05.

FIG. 3 is a sensor data table illustrating an example of sensor data accumulated by the accumulation unit 102 at the time of 10:00:05. The sensor data table in FIG. 3 is a table having a time stamp field 301, a steering angle field 302, a latitude field 303, a longitude field 304, an image field 305, and a sinking angle field 306.

The time stamp field 301 is a field in which time information at which the sensor data is measured by the measurement unit 101 is described. The time stamp field 301 of a record 307 in FIG. 3 indicates that the record 307 is measured at the time of 10:00:00.000. The steering angle field 302 is a field in which the steering angle of the vehicle which the measurement unit 101 measures with the steering angle sensor installed in the vehicle is described. The latitude field 303 is a field in which the latitude of the vehicle position which the measurement unit 101 measures with the satellite signal receiver installed in the vehicle is described. The longitude field 304 is a field in which the longitude of the vehicle position which the measurement unit 101 measures with the satellite signal receiver installed in the vehicle is described. The image field 305 is a field that stores image data, which the measurement unit 101 captures by the camera installed in the vehicle, in the forward direction of the vehicle. The image field 305 in FIG. 3 is described as "image A" or the like for convenience, but actually stores binary data of image data. In the first embodiment, the image is captured at 50 fps, and thus in a case where no image data is present without performing capturing at the time of the time stamp, "no capturing" is set in the image field 305. The sinking angle field 306 is a field in which the pitch angle of the vehicle which the measurement unit 101 measures with the gyro sensor installed in the vehicle is described. The sinking angle field 306 of the record 307 indicates that the sinking of −0.002 radians is measured in the vehicle.

The data collection process executed in the in-vehicle device 100 will be described. The data collection processing is started when the reception unit 103 receives an instruction signal instructing to execute data collection from another device (for example, a driving assistance system) in the vehicle. For example, when the driving assistance system actuates emergency braking, a data collection instruction is transmitted as an electric signal from the driving assistance system to the in-vehicle device 100, and the reception unit 103 detects the electric signal and starts the data collection process. Alternatively, the data collection instruction may be received from a server outside the vehicle via a network, and the data collection process may be executed.

Figure 4:
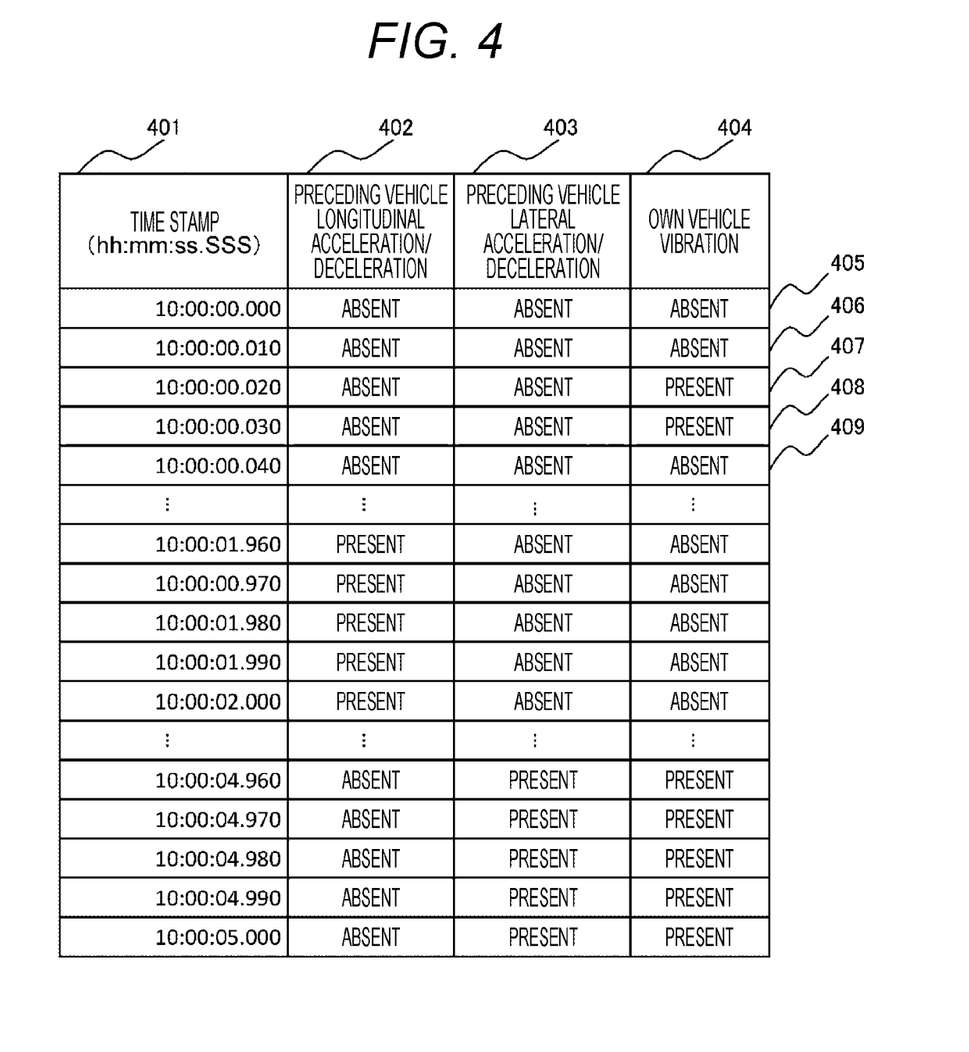
FIG. 4 is an operation determination result table illustrating an example of a result of the operation determination unit 104 determining an operation of an own vehicle and an operation of a surrounding object on the basis of the sensor data illustrated in FIG. 3.

FIG. 4 is an operation determination result table illustrating an example of a result of the operation determination unit 104 determining the operation of the own vehicle and the operation of the surrounding object on the basis of the sensor data illustrated in FIG. 3. When the data collection processing is started, the operation determination unit 104 identifies the operation of the own vehicle and the operation of surrounding object on the basis of the sensor data accumulated by the accumulation unit 102. Detailed processing of the operation determination of the operation determination unit 104 will be described with reference to FIG. 4.

The operation determination result table of FIG. 4 is a table having a time stamp field 401, a preceding vehicle longitudinal acceleration/deceleration field 402, a preceding vehicle lateral acceleration/deceleration field 403, and an own vehicle vibration field 404.

The time stamp field 401 is a field describing the time at which the operation determination unit 104 has determined the operation. The time stamp field 401 of the record 405 in FIG. 4 indicates that the record 405 is at the time of 10:00:00.000. The preceding vehicle longitudinal acceleration/deceleration field 402 is a field in which a result of the operation determination unit 104 determining whether or not the preceding vehicle is accelerated/decelerated in a preceding vehicle longitudinal direction is described. The preceding vehicle longitudinal acceleration/deceleration field 402 of the record 405 indicates that acceleration/deceleration in the preceding vehicle longitudinal direction has not occurred in the preceding vehicle. The preceding vehicle lateral acceleration/deceleration field 403 is a field in which a result of the operation determination unit 104 determining whether or not the preceding vehicle is accelerated/decelerated in a preceding vehicle lateral direction is described. The preceding vehicle lateral acceleration/deceleration field 403 of the record 405 indicates that acceleration/deceleration in the preceding vehicle lateral direction has not occurred in the preceding vehicle. The own vehicle vibration field 404 is a field in which a result of the operation determination unit 104 determining the presence or absence of vibration of the own vehicle is described. The own vehicle vibration field 404 of the record 405 indicates that no vibration has occurred in the vehicle.

Processing of the vehicle operation recognition unit 108 in the operation determination unit 104 will be described. First, the vehicle operation recognition unit 108 reads one piece of the sensor data accumulated by the accumulation unit 102. For example, the record 307 of the sensor data table illustrated in FIG. 3 is read. Next, with reference to the sinking angle field 306 in the read sensor data, in a case where the sinking angle is 0.005 radians or more, it is determined that the vibration of the own vehicle is "present". When the sinking angle is less than 0.005 radians, it is determined that the vibration of the own vehicle is "absent". For example, the sinking angle field 306 of the record 307 is "−0.002 radians", and thus it is determined that the vibration of the own vehicle is "absent", and "absent" is described in the own vehicle vibration field 404 of the record 405 in the operation determination result table of FIG. 4. If the sensor data accumulated by the accumulation unit 102 still remains, similar processing is performed, and if not, this processing ends.

Processing of the surrounding object operation recognition unit 109 in the operation determination unit 104 will be described. First, the surrounding object operation recognition unit 109 reads one piece of the sensor data accumulated by the accumulation unit 102. For example, the record 307 of the sensor data table illustrated in FIG. 3 is read. Next, with reference to the image field 305 in the read sensor data, a relative distance to the preceding vehicle in the longitudinal direction and the lateral direction is calculated. For example, the feature point coordinates of the preceding vehicle on the image A are detected using an existing image recognition technique, and the relative distance to the preceding vehicle is calculated on the basis of the camera parameters measured in advance. Subsequently, the latitude and longitude of the preceding vehicle are obtained by synthesizing the calculated relative distance to the preceding vehicle in the longitudinal direction and the lateral direction and the information (the steering angle field 302, the latitude field 303, and the longitude field 304) of the position and the posture of the own vehicle in the sensor data table illustrated in FIG. 3. If the sensor data accumulated by the accumulation unit 102 still remains, similar processing is performed, and the latitude and longitude of the preceding vehicle are calculated by utilizing all the pieces of sensor data in FIG. 3.

Subsequently, the surrounding object operation recognition unit 109 calculates the acceleration of the preceding vehicle in the longitudinal direction and the lateral direction on the basis of the calculated time series data of the latitude and longitude of the preceding vehicle. For example, the moving distance of the preceding vehicle in the longitudinal direction and the lateral direction is obtained from the latitude and longitude of the preceding vehicle calculated by the record 307 of FIG. 3 and the latitude and longitude of the preceding vehicle calculated by the record 308, and the moving distance is divided by a time difference of 0.1 seconds to calculate the speed of the preceding vehicle in the longitudinal direction and the lateral direction. A difference between the speeds calculated in the same manner is divided by the time difference to obtain the acceleration of the preceding vehicle in the longitudinal direction and the lateral direction. This processing is repeated, and the acceleration is also calculated for all the pieces of sensor data in FIG. 3.

Subsequently, the surrounding object operation recognition unit 109 reads one piece of the data of the calculated acceleration and determines the presence or absence of acceleration/deceleration of the preceding vehicle in the longitudinal direction and the lateral direction. For example, with reference to the longitudinal acceleration (m/s$^2$) of the preceding vehicle at 10:00:00, when the absolute value is equal to or greater than a threshold of 2.00, it is determined that the acceleration/deceleration of the preceding vehicle in the longitudinal direction is "present", and when the absolute value is less than the threshold of 2.00, it is determined that the acceleration/deceleration is "absent", and the determination result is described in the preceding vehicle longitudinal acceleration/deceleration field 402 of the record 405 of the operation determination result table of FIG. 4. Similarly, with reference to the lateral acceleration (m/s$^2$) of the preceding vehicle at 10:00:00, when the absolute value is equal to or greater than the threshold of 2.00, it is determined that the acceleration/deceleration of the preceding vehicle in the lateral direction is "present", and when the absolute value is less than the threshold of 2.00, it is determined that the acceleration/deceleration is "absent", and the determination result is described in the preceding vehicle lateral acceleration/deceleration field 403 of the record 405 of the operation determination result table in FIG. 4. If the calculated acceleration still remains, similar processing is performed, and if not, this processing ends.

Returning to the data collection process, the data selection unit 105 determines the necessity of data collection or the collection period for each data item on the basis of the operation determination result output by the operation determination unit 104, and outputs the result as a data selection result. Detailed processing of the data selection of the data selection unit 105 will be described with reference to FIGS. 5 and 6.

Figure 5:
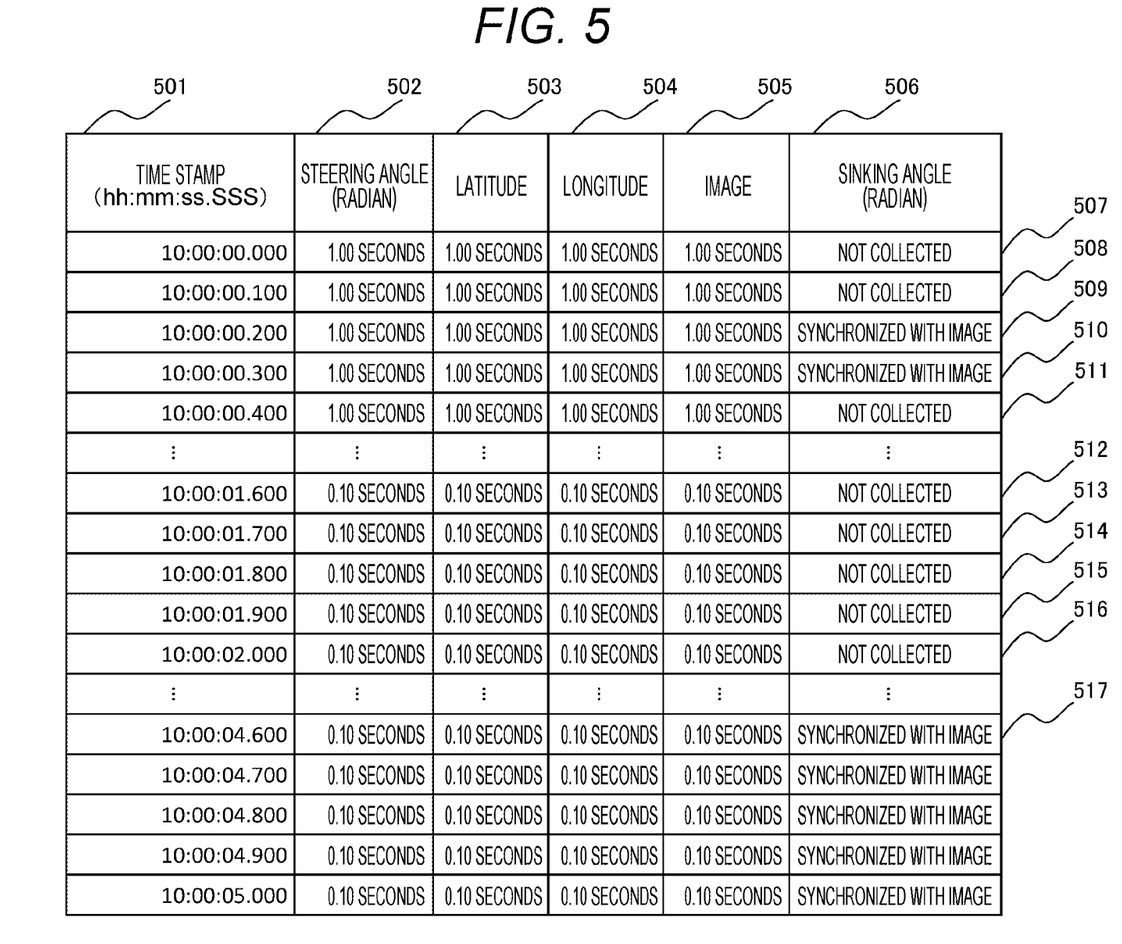
FIG. 5 is a data selection result table illustrating an example of a result of a data selection unit 105 selecting data on the basis of the operation determination result of the own vehicle and the surrounding object illustrated in FIG. 4.

FIG. 5 is a data selection result table illustrating an example of a result of the data selection unit 105 selecting data on the basis of the operation determination result of the own vehicle and the surrounding object illustrated in FIG. 4. The data selection table in FIG. 5 is a table having a time stamp field 501, a steering angle field 502, a latitude field 503, a longitude field 504, an image field 505, and a sinking angle field 506.

The time stamp field 501 is a field describing the time at which the data selection unit 105 has selected data. The time stamp field 501 of the record 507 in FIG. 5 indicates that the record 507 is a data selection result regarding the sensor data at the time of 10:00:00.000. The steering angle field 502 is a field in which a result of the data selection unit 105 determining the necessity of collection of the steering angle or the sampling period is described. The steering angle field 502 of the record 507 indicates that the sampling period of the steering angle is 1.00 seconds. The latitude field 503 is a field in which a result of the data selection unit 105 determining the necessity of collection of the latitude or the sampling period is described. The latitude field 503 of the record 507 indicates that the sampling period of the latitude is 1.00 seconds. The longitude field 504 is a field in which a result of the data selection unit 105 determining the necessity of collection of the longitude or the sampling period is described. The longitude field 504 of the record 507 indicates that the sampling period of the longitude is 1.00 seconds. The image field 505 is a field in which a result of the data selection unit 105 determining the necessity of collection of the image or the sampling period is described. The image field 505 of the record 507 indicates that the sampling period of the image is 1.00 seconds. The own vehicle sinking angle field 506 is a field in which a result of the data selection unit 105 determining the necessity of collection of the own vehicle sinking angle or the sampling period is described. The own vehicle sinking angle field 506 of the record 507 indicates that the data of the own vehicle sinking angle is not collected.

Figure 6:
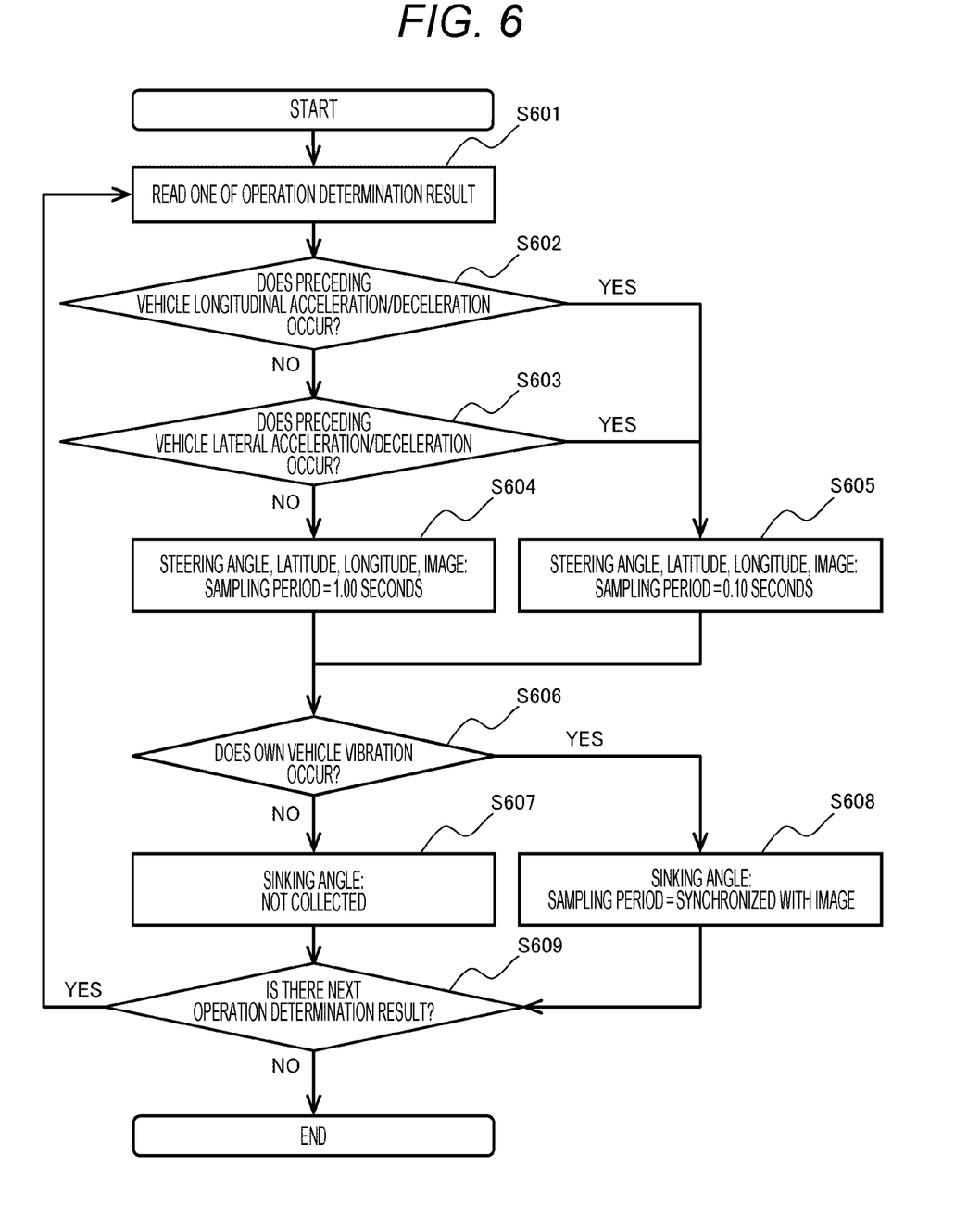
FIG. 6 is a flowchart illustrating an example of data selection processing of a data selection unit 105.

FIG. 6 is a flowchart illustrating an example of data selection processing of the data selection unit 105. Details of the data selection processing in the data selection unit 105 will be described with reference to a flowchart of FIG. 6.

(FIG. 6: Step S601)

The data selection unit 105 reads one piece of the operation determination result data output by the operation determination unit 104. For example, the record 405 of the operation determination result table illustrated in FIG. 4 is read.

(FIG. 6: Step S602)

The data selection unit 105 determines whether or not a front object longitudinal acceleration/deceleration has occurred in the operation determination result read in S601 (S602). If the front object longitudinal acceleration/deceleration occurs, the process proceeds to step S605, and if the front object longitudinal acceleration does not occur, the process proceeds to step S603.

(FIG. 6: Step S603)

The data selection unit 105 determines whether or not a front object lateral acceleration/deceleration has occurred in the operation determination result read in S601. If the front object lateral acceleration/deceleration occurs, the process proceeds to step S605, and if the front object lateral acceleration does not occur, the process proceeds to step S604.

(FIG. 6: Step S604)

The data selection unit 105 sets the sampling period of the steering angle, latitude, longitude, and image to 1.0 seconds at the time of the time stamp of the operation determination result read in S601, and the process proceeds to step S606. For example, "1.00 seconds" is described in the steering angle field 502 to the image field 505 of the record 507 of the data selection result table of FIG. 5.

(FIG. 6: Step S605)

The data selection unit 105 sets the sampling period of the steering angle, latitude, longitude, and image to 0.10 seconds at the time of the time stamp of the operation determination result read in S601, and the process proceeds to step S606.

(FIG. 6: Step S606)

The data selection unit 105 determines whether or not an own vehicle vibration has occurred in the operation determination result read in S601. If the own vehicle vibration occurs, the process proceeds to step S608, and if the own vehicle vibration does not occur, the process proceeds to step S607.

(FIG. 6: Step S607)

The data selection unit 105 determines that data of the own vehicle sinking angle is not collected at the time of the time stamp of the operation determination result read in S601, and the process proceeds to step S609. For example, "not collected" is described in the own vehicle sinking angle field 506 of the record 507 of the data selection result table of FIG. 5.

(FIG. 6: Step S608)

The data selection unit 105 sets the sampling period of the own vehicle sinking angle to be synchronized with the sampling period of the image determined in S604 or S605 at the time of the time stamp of the operation determination result read in S601, and the process proceeds to step S609.

(FIG. 6: Step S609)

If the operation determination result data output by the operation determination unit 104 still remains, the data selection unit 105 returns to S601, and if not, ends the data selection processing.

Returning to the data collection processing, the data compression unit 106 compresses and outputs the sensor data accumulated by the accumulation unit 102 on the basis of the data selection result output by the data selection unit 105. A compression example will be described with reference to FIG. 7.

Figure 7:
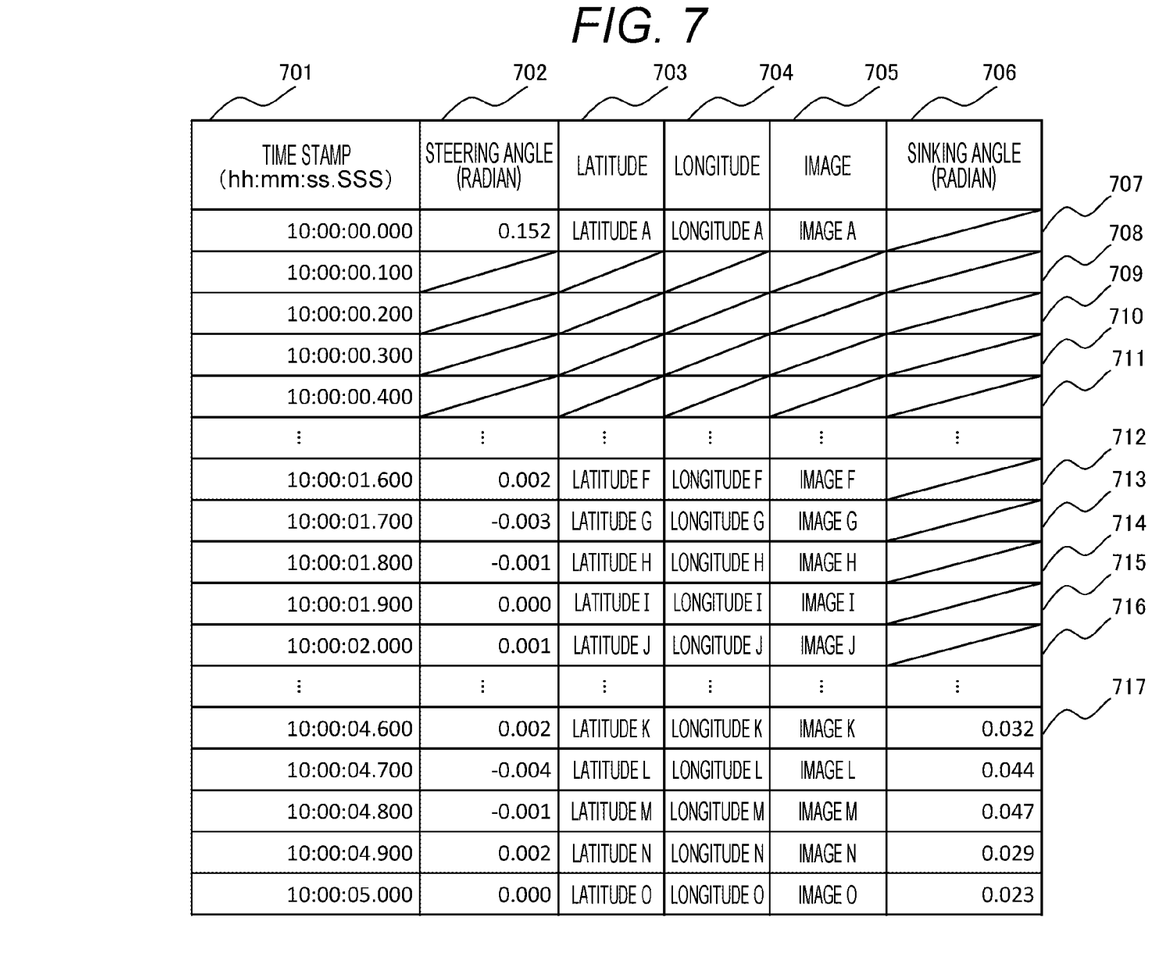
FIG. 7 is a compressed sensor data table illustrating an example of a result of a data compression unit 106 compressing the sensor data illustrated in FIG. 3 on the basis of the data selection result illustrated in FIG. 5.

FIG. 7 is a compressed sensor data table illustrating an example of the result of the data compression unit 106 compressing the sensor data illustrated in FIG. 3 on the basis of the data selection result illustrated in FIG. 5. The compressed sensor data table is a table having a time stamp field 701, a steering angle field 702, a latitude field 703, a longitude field 704, an image field 705, and a sinking angle field 706.

The time stamp field 701 is a field in which time information at which the sensor data is measured by the measurement unit 101 is described. The steering angle field 702 is a field in which the steering angle of the vehicle which the measurement unit 101 measures with the steering angle sensor installed in the vehicle is described. The latitude field 703 is a field in which the latitude of the vehicle position which the measurement unit 101 measures with the satellite signal receiver installed in the vehicle is described. The longitude field 704 is a field in which the longitude of the vehicle position which the measurement unit 101 measures with the satellite signal receiver installed in the vehicle is described. The image field 705 is a field that stores image data, which the measurement unit 101 captures with the camera installed in the vehicle, in the forward direction of the vehicle. The sinking angle field 706 is a field in which the pitch angle of the vehicle which the measurement unit 101 measures with the gyro sensor installed in the vehicle is described.

Details of the data compression processing in the data compression unit 106 will be described. In the data selection result table illustrated in FIG. 5, "1.00 seconds" is described in the steering angle field 502 in the records 507 to 511. On the basis of this, the data compression unit 106 resamples the data of the steering angle field 502 in the data selection result table of FIG. 5 with a sampling period of 1.00 seconds in the time of 10:00:00.000 to 10:00:00.400, and describes the result in the steering angle field 702 of the records 707 to 711 in the compressed sensor data table of FIG. 7.

In the records 512 to 516 of the data selection result table illustrated in FIG. 5, "1.00 seconds" is described in the steering angle field 502. On the basis of this, the data compression unit 106 resamples the data of the steering angle field 502 in the data selection result table of FIG. 5 with a sampling period of 1.00 seconds in the time of 10:00:01.600 to 10:00:02.000, and describes the result in the steering angle field 702 of the sensor data 712 to 716 in the compressed sensor data table of FIG. 7. Similarly, the data compression unit 106 performs similar processing on the latitude field 503 to the image field in FIG. 5, and outputs the compressed sensor data illustrated in FIG. 7.

In the data selection result table illustrated in FIG. 5, "not collected" is described in the sinking angle field 506 in the record 507. On the basis of this, the data compression unit 106 does not collect the data of the sinking angle field 506 in the data selection result table of FIG. 5 at the time of 10:00:00.000, and leaves the sinking angle field 506 of the record 707 in the compressed sensor data table of FIG. 7 blank.

In the data selection result table illustrated in FIG. 5, "synchronized with image" is described in the sinking angle field 506 in the record 517. On the basis of this, since the data of the image field 505 is collected at the time of 10:00:04.600, the data compression unit 106 describes the data of the sinking angle field 506 in the data selection result table of FIG. 5 in the sinking angle field 706 of the sensor data 717 in the compressed sensor data table of FIG. 7.

Through these processes, the data compression unit 106 outputs the compressed sensor data illustrated in FIG. 7. In the first embodiment, 22 pieces out of 60 pieces of data of the steering angle field 302 to the longitude field 304 and the sinking angle 306 of the sensor data of FIG. 3 are excluded from the data collection target as illustrated in FIG. 7. In addition, 4 pieces out of 15 pieces of data in the image field 305 are excluded from the data collection target as illustrated in FIG. 7. Therefore, for example, when the data of the steering angle field 302 to the longitude field 304 and the sinking angle 306 is a 4-byte single-precision floating-point type, the data capacity reduction from 240 bytes to 152 bytes is realized. Further, for example, when the image data is 200 kilobytes per piece, a capacity reduction from 3 megabytes to 2.2 megabytes is realized.

Returning to the data collection processing, the transmission unit 107 transmits the compressed sensor data output by the data compression unit 106 to another device in the vehicle, a server outside the vehicle, or the like via a cable, a network, or the like.

First Embodiment: Summary

The in-vehicle device 100 according to the first embodiment acquires sensor data or the like indicating a vehicle state and a vehicle surrounding situation, identifies a vehicle operation or a surrounding object operation from a record in the sensor data, and then selects and outputs the record in which the operation is equal to or greater than a threshold. As a result, data can be selectively collected according to the operation of the own vehicle and the operation of the surrounding object. Therefore, the data capacity can be suppressed while securing the data item and the sampling period necessary for the analysis of the accident situation or the like.

Second Embodiment

Figure 8:
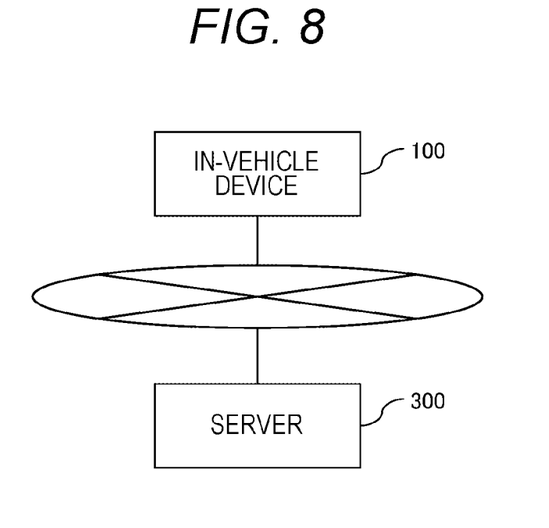
FIG. 8 is a configuration diagram of a vehicle operation analysis system according to a second embodiment.

FIG. 8 is a configuration diagram of a vehicle operation analysis system according to a second embodiment of the present invention. The sensor data transmitted by the transmission unit 107 can be restored to data of a high sampling period in the server 300 outside the transmission destination vehicle by using a state estimation theory, for example. For example, the server 300 can use a linear Kalman filter that estimates non-observation data by using a linear dynamic model and observation data. The server 300 can be configured by a computer connected to the in-vehicle device 100 via a network.

In the time zone of 10:00:00.000 to 10:00:00.400 corresponding to the records 707 to 711 of FIG. 7, the sampling period is 1.00 seconds as in the record 507~511 of FIG. 5. Further, according to the records 405 to 409 of FIG. 4, in the time zone, acceleration/deceleration in the longitudinal and lateral directions of the preceding vehicle is "absent", and thus, it is possible to construct a linear dynamic model regarding the preceding vehicle. Therefore, in the time zone, the server 300 can interpolate sensor data with a sampling period of 0.01 seconds, for example, by using a technique such as a linear Kalman filter. Similarly, by performing interpolation for the entire time zone of the sensor data, data with a sampling period of 0.10 seconds regarding the position of the preceding vehicle is obtained.

The procedure in which the server 300 interpolates the sensor data is not limited thereto, and another appropriate procedure may be used. In addition to the sensor data, image data may be generated by interpolation.

For example, when analyzing the cause of an accident or the like, the server 300 can acquire sensor data interpolated according to the above procedure and perform analysis work by using the interpolated sensor data. As a result, an analysis accuracy can be maintained while suppressing the amount of data acquired by the in-vehicle device 100. In addition, since it is sufficient for the server 300 to interpolate the sensor data as necessary when performing analysis work or the like, it is not necessary to always hold the interpolated sensor data on the server 300. Therefore, the amount of data can also be suppressed on the server 300.

Modification of Invention

The present invention is not limited to the above-described embodiments, and various modifications are included. For example, the above-described embodiments have been described in detail for easy understanding of the invention and are not necessarily limited to those having all the described configurations. In addition, a part of the configuration of a certain embodiment can be replaced with the configuration of another embodiment, and the configuration of another embodiment can be added to the configuration of a certain embodiment. It is possible to add, delete, and replace other configurations for a part of the configuration of each embodiment.

In the above embodiments, it has been described that the sinking angle is not collected in a case where there is no own vehicle vibration (S607). Alternatively, the sinking angle may be collected with a sampling period longer compared to a case where there is an own vehicle vibration. Even in this case, the amount of sensor data can be suppressed.

In the above embodiments, it has been described that the operation of the surrounding object is determined using the image data collected by a monocular camera installed in the vehicle. However, for example, the operation of the surrounding object may be identified using data collected by a stereo camera, a millimeter wave radar, a LIDAR sensor, or the like.

Each of the above-described configurations, functions, processing units, processing means, and the like may be realized by hardware by designing a part or all of them with, for example, an integrated circuit. In addition, each of the above-described configurations, functions, and the like may be realized by software by a processor interpreting and executing a program for realizing each function. Information such as a program, a table, and a file for realizing each function can be stored in a memory, a recording device such as a hard disk and a solid state drive (SSD), or a recording medium such as an IC card, an SD card, or a DVD.

REFERENCE SIGNS LIST 100 in-vehicle device
101 measurement unit
102 accumulation unit
103 reception unit
104 operation determination unit
105 data selection unit
106 data compression unit
107 transmission unit
108 vehicle operation recognition unit
109 surrounding object operation recognition unit
300 server

The invention claimed is:

1. An in-vehicle device mounted on a vehicle, the in-vehicle device comprising a controller configured to:
   acquire data indicating a state of the vehicle and a surrounding situation of the vehicle;
   recognize an operation of the vehicle using the data;
   recognize an operation of a surrounding object of the vehicle using the data;
   select at least one of a record described in the data in which a numerical value representing the operation of the vehicle is equal to or greater than a first threshold or a record described in the data in which a numerical value representing the operation of the surrounding object is equal to or greater than a second threshold value; and
   output the record among records described in the data;
   identify an operation of the vehicle for each record described in the data;
   identify the operation of the surrounding object for each record described in the data; and
   select a record described in the data by setting, for each record, a sampling period of a record to be sampled from the data among the records described in the data; wherein
   for the record in which the numerical value representing the operation of the surrounding object is equal to or greater than the second threshold, the controller sets the sampling period to a third period;
   for the record in which the numerical value representing the operation of the surrounding object is less than the second threshold, the controller is configured to set the sampling period to a fourth period longer than the third period; and
   output compressed data in which a data size of the data is compressed by sampling the record described in the data according to the sampling period.

2. The in-vehicle device according to claim 1, wherein, for the record in which the numerical value representing the operation of the vehicle is equal to or greater than the first threshold, the controller sets the sampling period to a first period,
   for the record in which the numerical value representing the operation of the vehicle is less than the first threshold, the controller sets the sampling period to a second period longer than the first period or does not sample the record, and
   the controller outputs compressed data in which a data size of the data is compressed by sampling the record described in the data according to the sampling period.

3. The in-vehicle device according to claim 2, wherein the controller is further configured to:
   acquire image data obtained by capturing an image around the vehicle as the data indicating the surrounding situation of the vehicle,
   acquire a pitch angle of the vehicle as the data indicating the state of the vehicle,
   use the pitch angle of the vehicle as a numerical value representing the operation of the vehicle, and synchronize the sampling period with the image data for the record in which the pitch angle is equal to or greater than the first threshold, and the controller does not sample, from the data, the record in which the pitch angle is less than the first threshold.

4. The in-vehicle device according to claim 1, wherein the controller is further configured to:
acquire a pitch angle of the vehicle as the data indicating the state of the vehicle, and
recognize that the vehicle is performing a sinking operation when the pitch angle of the vehicle is equal to or greater than a threshold.

5. The in-vehicle device according to claim 1, wherein the controller is further configured to:
acquire image data obtained by capturing an image around the vehicle as the data indicating the surrounding situation of the vehicle,
acquire a steering angle of the vehicle and position coordinates of the vehicle as the data indicating the state of the vehicle,
calculate a relative distance between the vehicle and the surrounding object by using the image data,
calculate position coordinates of the surrounding object by using the steering angle of the vehicle, the position coordinates of the vehicle, and the relative distance, and
calculate the operation of the surrounding object by time-differentiating the position coordinates of the surrounding object.

6. The in-vehicle device according to claim 5, wherein the controller is further configured to surrounding object operation recognition unit calculate, as the operation of the surrounding object, a longitudinal acceleration/deceleration of the surrounding object and a lateral acceleration/deceleration of the surrounding object.

7. The in-vehicle device according to claim 1, wherein the controller is further configured to:
acquire image data obtained by capturing an image around the vehicle as the data indicating the surrounding situation of the vehicle,
acquire a steering angle of the vehicle and position coordinates of the vehicle as the data indicating the state of the vehicle,
use a longitudinal acceleration/deceleration of the surrounding object and a lateral acceleration/deceleration of the surrounding object as numerical values representing the operation of the surrounding object,
for the record in which the numerical value representing the operation of the surrounding object is equal to or greater than the second threshold, the controller sets the steering angle of the vehicle, the position coordinates of the vehicle, and a sampling period of the image data to the third period, and
for the record in which the numerical value representing the operation of the surrounding object is less than the second threshold, the controller sets the steering angle of the vehicle, the position coordinates of the vehicle, and the sampling period of the image data to the fourth period.

8. A vehicle operation analysis system comprising:
an in-vehicle device mounted on a vehicle;
and a server installed outside the vehicle, wherein the in-vehicle device includes
a controller configured to:
acquire data indicating a state of the vehicle and a surrounding situation of the vehicle,
recognize an operation of the vehicle by using the data,
recognize an operation of a surrounding object of the vehicle by using the data,
select at least one of a record described in the data in which a numerical value representing the operation of the vehicle is equal to or greater than a first threshold or a record described in the data in which a numerical value representing the operation of the surrounding object is equal to or greater than a second threshold value, and
output the record among records described in the data, and
the server generates data having a sampling rate higher than that of the data output by interpolating a record described in the data.

9. The vehicle operation analysis system according to claim 8, wherein the controller is further configured to:
acquire image data obtained by capturing an image around the vehicle as the data indicating the surrounding situation of the vehicle,
calculate position coordinates of the surrounding object by calculating a relative distance between the vehicle and the surrounding object by using the image data,
calculate acceleration/deceleration of the surrounding object as the operation of the surrounding object by time-differentiating the position coordinates of the surrounding object, and
the server interpolates the data output by performing linear interpolation between records which are described in the data and in which there is no acceleration/deceleration of the surrounding object.

* * * * *